(12) United States Patent
Gumpinger et al.

(10) Patent No.: US 10,131,085 B2
(45) Date of Patent: Nov. 20, 2018

(54) CLIP TRANSPORTING UNIT

(71) Applicant: BRÜCKNER MASCHINENBAU GMBH & CO. KG, Siegsdorf (DE)

(72) Inventors: Helmut Gumpinger, Anger (DE); Wolfgang Eiselmayer, Saalfelden (AT); Rudolf Jauernig, Taching (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 106 days.

(21) Appl. No.: 15/029,077

(22) PCT Filed: Sep. 18, 2014

(86) PCT No.: PCT/EP2014/002534
§ 371 (c)(1),
(2) Date: Apr. 13, 2016

(87) PCT Pub. No.: WO2015/055272
PCT Pub. Date: Apr. 23, 2015

(65) Prior Publication Data
US 2016/0250801 A1    Sep. 1, 2016

(30) Foreign Application Priority Data
Oct. 14, 2013   (DE) .................. 10 2013 017 011

(51) Int. Cl.
*B29C 55/20*    (2006.01)
(52) U.S. Cl.
CPC .................. *B29C 55/20* (2013.01)

(58) Field of Classification Search
CPC ....................................... B29C 55/20
See application file for complete search history.

(56) References Cited

U.S. PATENT DOCUMENTS

| | | |
|---|---|---|
| 3,148,409 A | 9/1964 | Brückner |
| 3,488,668 A * | 1/1970 | Wilczewski ............ B29C 55/20 26/93 |

(Continued)

FOREIGN PATENT DOCUMENTS

| | | |
|---|---|---|
| CN | 101658892 | 3/2010 |
| DE | 44 36 676 | 4/1996 |

(Continued)

OTHER PUBLICATIONS

International Search Report and Written Opinion of the ISA for PCT/EP2014/002534, dated Nov. 21, 2014, 7 pages.

(Continued)

*Primary Examiner* — Michael N Orlando
*Assistant Examiner* — Cynthia L Schaller
(74) *Attorney, Agent, or Firm* — Nixon & Vanderhye P.C.

(57) ABSTRACT

The invention relates to an improved transporting unit for a transporting device, in particular for a transverse, longitudinal, and/or simultaneous stretching installation, wherein transporting units (KT) can be moved along a guiding and/or supporting rail by means of a clip unit (KL) and a drive unit (AT) connected to the clip unit, is characterized by the following features: the clip transporting unit (KT) or the clip unit (KL) and/or the drive unit (AT) has, for example, a volume or weight fraction of at least 60% that consists of a forged part (ST) and/or is composed of a forging blank (SR).

11 Claims, 13 Drawing Sheets

(56) References Cited

U.S. PATENT DOCUMENTS

| | | | | |
|---|---|---|---|---|
| 3,685,333 | A | * 8/1972 | Priebe | ............... B21D 25/00 |
| | | | | 72/302 |
| 5,051,225 | A | 9/1991 | Hommes et al. | |
| 5,791,031 | A | 8/1998 | Steffl | |
| 5,797,172 | A | 8/1998 | Hosmer | |
| 6,754,954 | B1 | 6/2004 | Decker | |
| 2004/0056380 | A1* | 3/2004 | Fukuzawa | ............ B29C 55/045 |
| | | | | 264/169 |
| 2006/0261619 | A1* | 11/2006 | Maffeis | ................ B25B 5/061 |
| | | | | 294/198 |

FOREIGN PATENT DOCUMENTS

| | | | | |
|---|---|---|---|---|
| DE | 44 41 020 | | 5/1996 | |
| EP | 0 471 052 | | 10/1994 | |
| GB | 191418722 A | * | 7/1915 | ............... D06C 3/04 |
| JP | 57-56133 | | 4/1982 | |
| JP | 57-134229 | | 8/1982 | |
| JP | 6-80751 | | 11/1994 | |
| JP | 10-507136 | | 7/1998 | |
| JP | 2004-322266 | | 11/2004 | |
| JP | 2005-48769 | | 2/2005 | |
| JP | 2005-212182 | | 8/2005 | |
| WO | WO 89/12543 | | 12/1989 | |
| WO | WO 2004/071748 | | 8/2004 | |
| WO | WO 2012/168566 | | 12/2012 | |

OTHER PUBLICATIONS

International Preliminary Report on Patentability issued in PCT/EP2014/002534 dated Apr. 19, 2016.

* cited by examiner

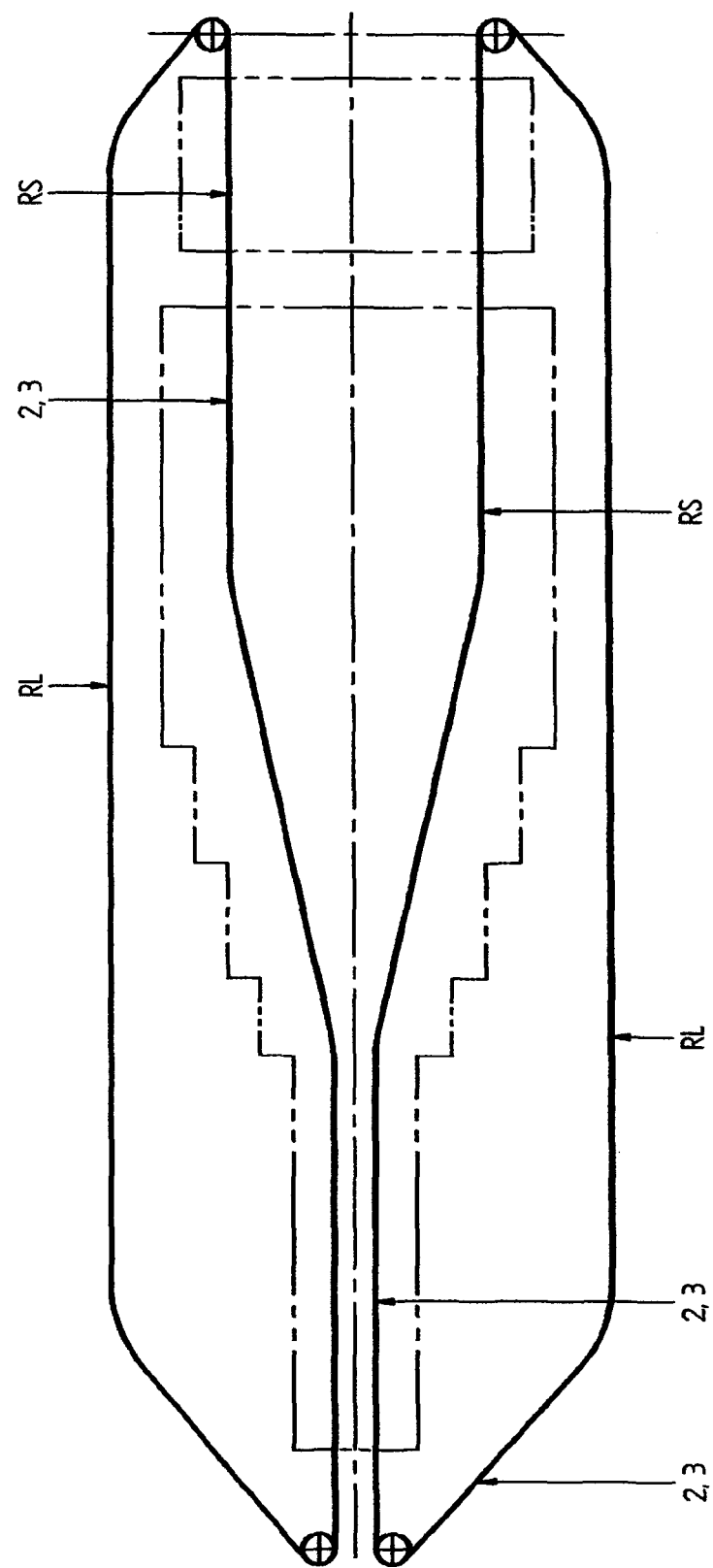

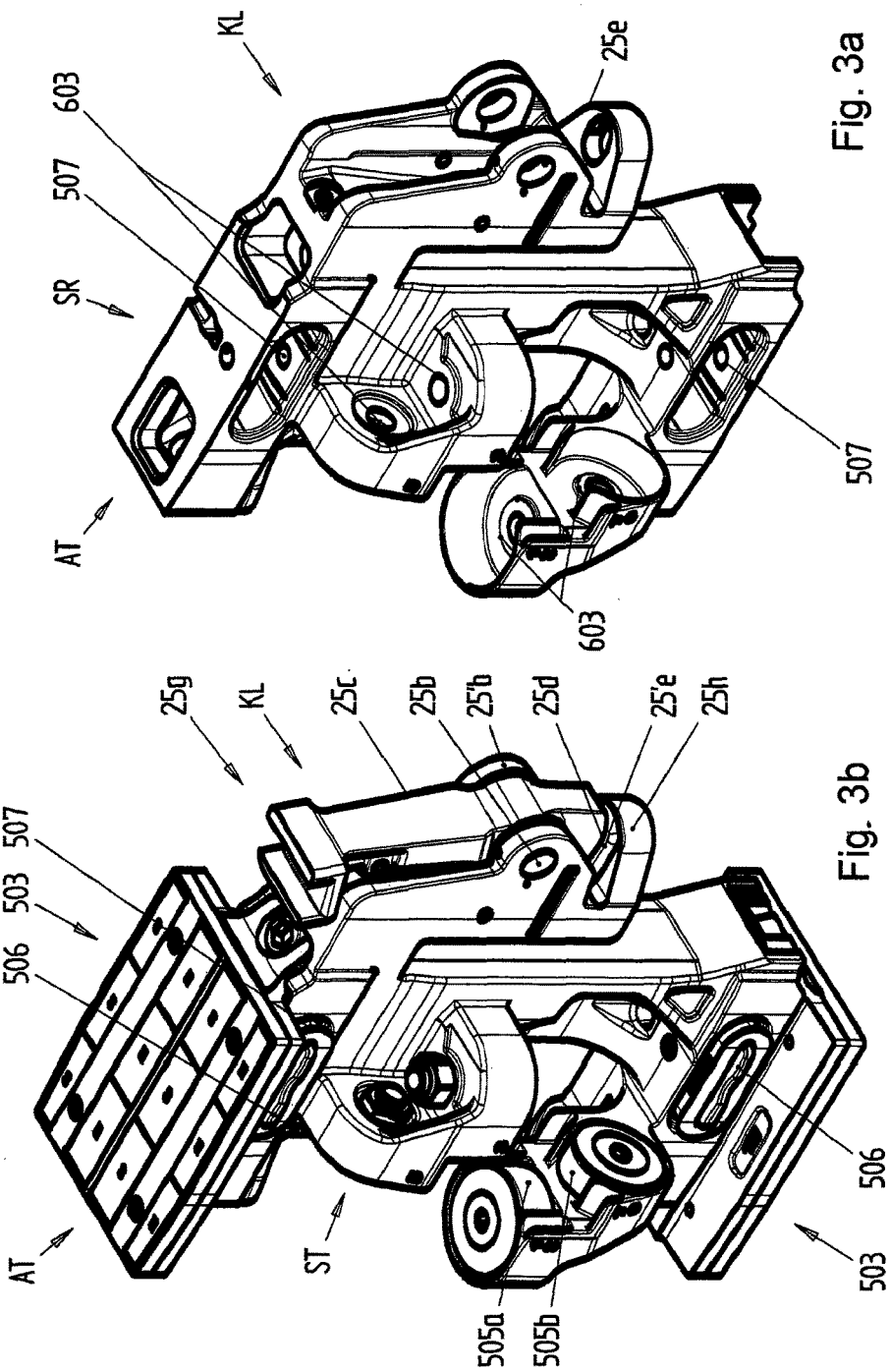

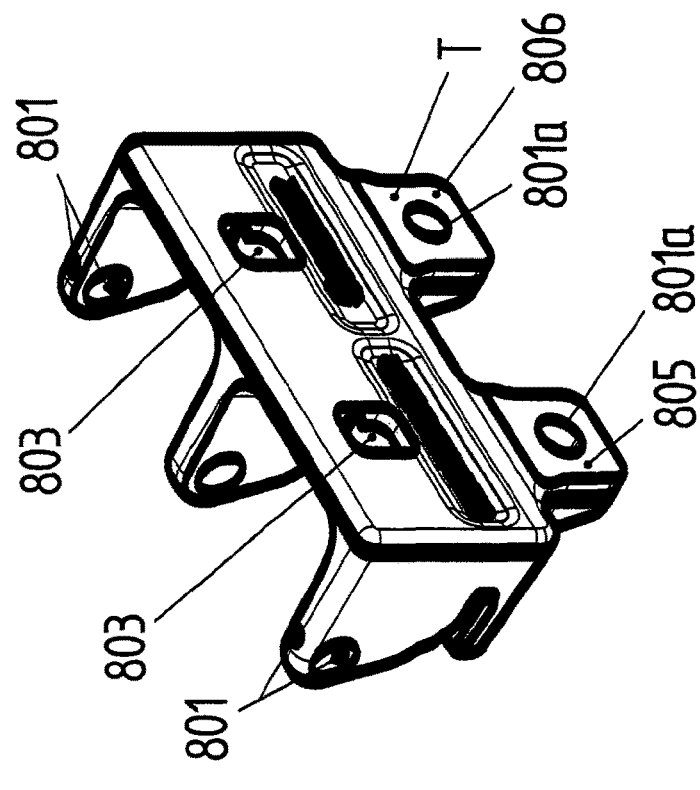
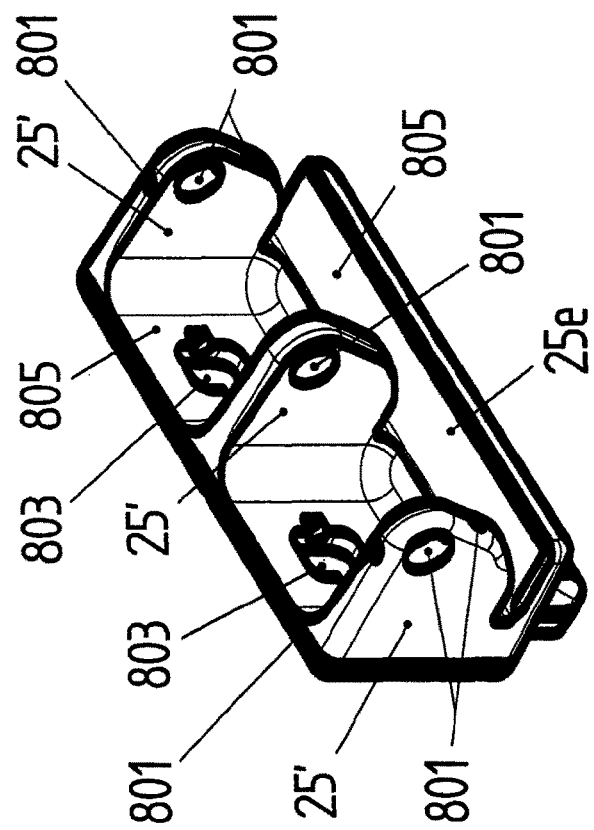
Fig. 8b
Fig. 8a

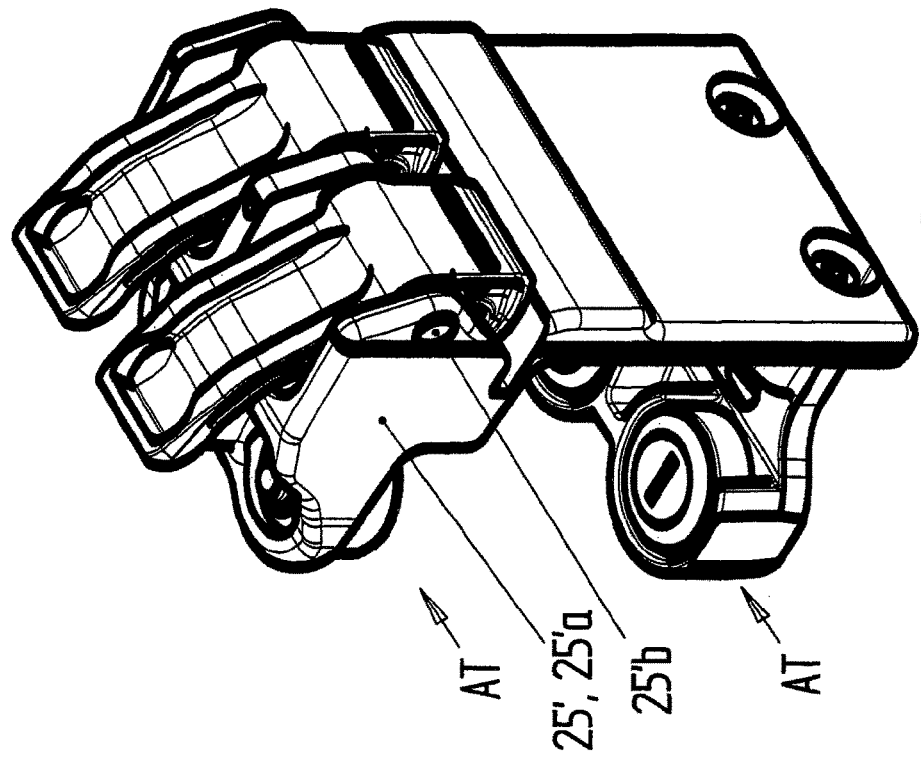
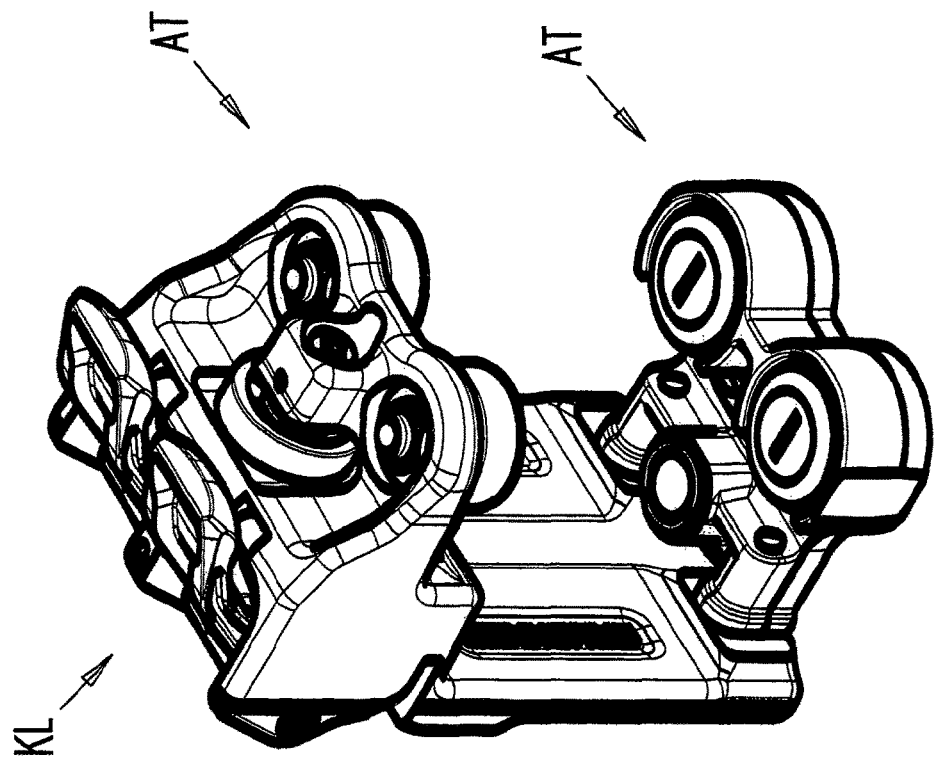

CLIP TRANSPORTING UNIT

This application is the U.S. national phase of International Application No. PCT/EP2014/002534 filed 18 Sep. 2014, which designated the U.S. and claims priority to DE Patent Application No. 10 2013 017 011.7 filed 14 Oct. 2013, the entire contents of each of which are hereby incorporated by reference.

The invention relates to a gripper transporting unit according to the preamble of claim 1, Stretching installations are used in particular in plastics film production. Simultaneous stretching installations are known, in which a plastics film can be stretched in both the transverse and the longitudinal direction simultaneously. Sequential stretching installations are also known, in which a plastics film is stretched in two successive steps, for example initially in the longitudinal direction and subsequently in the transverse direction (or vice versa).

The material web to be stretched, in other words in general a plastics film, is gripped by grippers which are displaceably arranged on encircling guide rails on either side of the material web to be stretched. The grippers are displaced in succession from an entry zone (in which the edge for example of a plastics film to be stretched is gripped) via a stretching zone (in which the opposing grippers are moved on the guide rail portions away from one another by means of a transverse component in a direction different to the transport direction) to an exit zone, and subsequently move on a return path back to the entry zone, it being possible for the film to be subjected for example to some relaxation and/or thermal post-processing in the exit zone.

In principle, a simultaneous or sequential transport and/or stretching system comprises a partially or fully encircling guide rail, along which the transport elements comprising the respective gripper units and the associated drive units are displaceably guided. A separate, additional weight-bearing support rail may also further be provided. In pentagraph systems, a control rail is also provided in addition to the guide rail.

In the transport units, which as stated comprise the gripper units and also the drive units, the drive units are configured differently in accordance with the system used. In transverse stretching installations, for example, these drive units consist of chain links to which the gripper units are fixed or on which the gripper units are correspondingly formed and arranged so as to be displaceable together with the chain units. In pentagraph systems, the drive units consist of pincer elements. In linear motor systems, secondary parts, i.e. in general permanent magnets, are in turn provided for the drive units and are driven by way of stationary electromagnets. The guidance and force absorption of the transport units, in other words in particular of the drive units on the guide rail or the guide rail and/or transport rail, are generally provided by way of slide and/or roller elements or a combination of slide and roller elements.

A transverse stretching installation comprising a roller bearing on a guide rail is known for example from EP 471 052 B1, In this case an encircling transport chain, which is an integral part of the transport system, is moveably guided and supported on the guide rail by way of gripper carriages. For this purpose, two support or guide wheels which rotate about a vertical axis, are provided on the two opposite vertical faces of the guide rail of rectangular cross section in each case. Further support wheels rotate about a horizontal axis and are arranged in such a way that the weight of the transport chain and the grippers is supported on the upper, horizontally orientated narrow face of the guide rail, In principle, however, the aforementioned roller bearings may also be replaced either completely or in part with slide bearings which are for example then moved along on the guide device (guide rail). A system of this type is known for example from U.S. Pat. No. 5,797,172 A. According to this prior publication, a material web to be stretched, in other words in general a plastics film, is gripped by grippers which are fixed to chains and which are displaceably arranged on encircling guide paths on either side of the material web to be stretched. As well as the gripper parts, in this case the transport units thus also in turn comprise transport parts in the form of chains. Unlike in the aforementioned prior art, however, the transport units are supported both by way of slide elements on two opposing sides of a guide rail and on a support rail provided beneath the guide rail and are slidingly displaceably guided thereon.

The aforementioned pentagraph systems are described for example in prior publications WO 2004/071 748 A1, U.S. Pat. No. 3,148,409 and JP 2004-322266 A, specifically together with their respective gripper parts which are connected to the associated transport unit either directly or via a bridge and which are displaced along the guide rail. The control of the stretching forces in the machine direction or drawing direction is ultimately initiated by the control rail, the transport units of which have the same construction as the units on the guide rail but do not comprise any gripper units. The connection and the drive input between the transport units on the control rail and guide rail are provided via the pincer levers of the pentagraph system.

Finally, systems operated by means of a linear motor are also known, for example from WO 89/12543 A1 or DE 44 41 020 C1. In systems of this type which are driven by a linear motor, the gripper part is connected to the drive part or transport part via a bridge. The drive force is introduced via correspondingly provided or fixed secondary parts, generally via flange-mounted permanent magnets which are provided in what are known as active drive units. In addition, idling transport units (idlers) without secondary parts are also provided, in other words non-actively-driven transport units without secondary parts, which have the same construction as the driven transport units and are moved together therewith by the film forces.

In this system too, the transport elements can be guided on the guide rail and/or on the support rail by way of slide units, roller units or a combination of the two.

In all of the aforementioned systems, the transport units are very complex to produce. Specifically, in practice the aforementioned transport and/or gripper parts have to be provided by precision casting, sand casting or Kroning casting. Manufacturing processes of this type are known to be extremely time-consuming. It is also found to be disadvantageous that changes to the construction take a very long time to be implemented.

Most importantly, however, the known casting methods run the risk of shrinkage cavities forming during the casting process which may lead to failure or breaking of the component. For this reason too, corresponding cast parts generally have to be cast having greater wall thicknesses so as to at least partially counteract this risk.

It should also be mentioned that the comparatively complicated geometry of these oast parts also results in the required post-processing becoming fundamentally more difficult. This is because the corresponding cast parts have to meet narrow tolerance limits so as to provide corresponding high-speed and steady-load performance of the transport units.

It is therefore the object of the invention to provide improved transport units, in other words in particular improved transport units having associated gripper parts.

The object is achieved according to the invention in accordance with the features set out in claim 1. Advantageous embodiments of the invention are set out in the dependent claims.

It is extremely surprising that the advantages according to the invention can be achieved in that the transport units, principally in terms of the basic constitution thereof, consist of forged bodies, in other words are produced by forging. One of the major resultant advantages is that the parts produced by forging require a lower throughput time. This greatly improves delivery and development times and material logistics by comparison with conventional solutions. In addition, the use of transport units and grippers in the form of forged parts ensures that casting shrinkage cavities cannot form. As a result, the units as a whole are much more reliable. Also, in the context of the invention, the measures principally required for increasing reliability, as in the prior art, are no longer necessary.

In addition, the forged parts according to the invention also make it possible to greatly reduce the overall height of the system as a whole.

Further, the forged parts according to the invention, in other words the transport parts and/or gripper parts substantially consisting of forged parts, can be used for example not only in sequential but also in simultaneous stretching installations.

Finally, in the context of the invention, it has also been found that it is sufficient for the forging blanks produced by forging to be designed without undercuts. They can then be post-processed in such a way as to have a shape such that, for example, the aforementioned pivotable pincer levers can be suspended thereon, dampers which are used for shock absorption during use as transport units can be fixed thereto, etc.

It is thus readily possible to configure the corresponding forged parts not to have an undercut such that in principle they have appropriate wail thicknesses for forging.

Although forged parts cannot be produced to the same precision as cast parts, this is not found to be a drawback or a significant drawback in practice. Forged parts require mechanical postprocessing in any case, and this is ultimately advantageous for the end product.

The fact that the use of transport parts and/or gripper parts based on forged parts or forging blanks ultimately leads to the separation of the grippers being to some extent greater than in conventional solutions is not found to be a significant drawback in practice either.

In the following, the invention is disclosed and described in greater detail on the basis of embodiments, and in some cases by comparison with conventional solutions. In the drawings:

FIG. 1b shows a detailed embodiment, modified from FIG. 1a, of a stretching installation, in which the return side for the drive unit extends outside a furnace separately from the process side;

FIG. 3a is a detailed perspective view of a transport unit prior to being equipped with installation parts in accordance with the prior art;

FIG. 3b is a detailed view corresponding to FIG. 3a in the case of a fully equipped transport unit which consists of a cast part;

FIG. 8a, FIG. 8b are two detailed views, from different viewing angles, corresponding to the preceding figures, FIGS. 6a to 7b, after the forging blank has been processed;

FIG. 9a, FIG. 9b show a detailed modified embodiment of an embodiment according to the invention of a gripper unit based on a roller bearing, the gripper part being shown from different viewing angles in FIGS. 9a and 9b, in a fully processed and equipped manner;

Figure 1A:
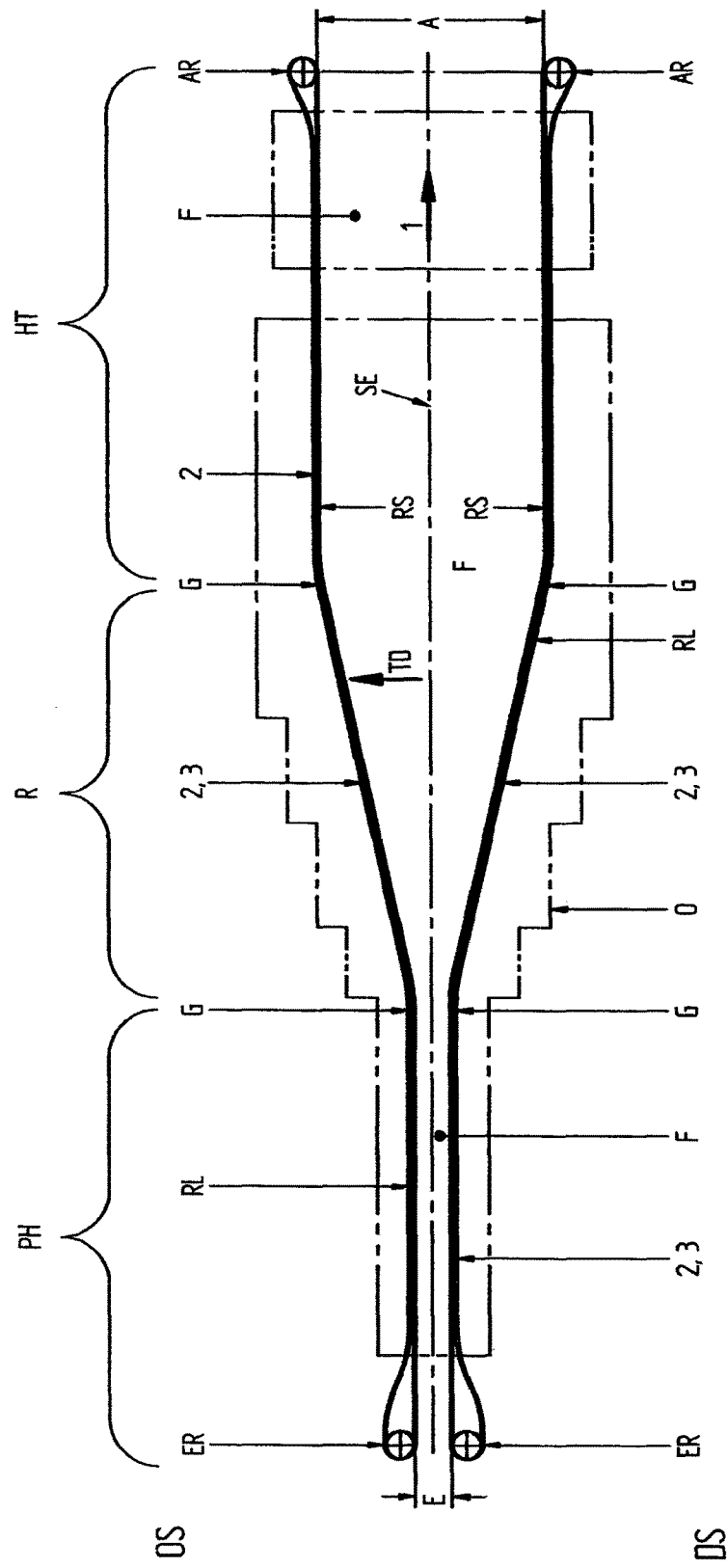
FIG. 1a is is a detailed schematic plan view of a stretching installation comprising a shared support structure for the process side and the return side within a furnace.

FIG. 1a is a schematic plan view of the basic construction of a transport installation in the form of a stretching installation. This stretching installation comprises two symmetrical drive systems which are arranged symmetrically with respect to a central plane of symmetry SE extending vertically with respect to the plane of the drawing. The material web to be treated, generally in the form of a plastics web F, passes through between the two drive systems circulating on closed paths, in the drawing direction 1. The stretching installation shown in FIG. 1a may for example be a simultaneous stretching installation, in which the material web and in particular the plastics film in the stretching zone R is stretched not only in the longitudinal direction but simultaneously in the transverse direction. Instead, the construction shown in FIG. 1a may for example also constitute a transverse film stretching installation, known as a TD (transverse direction) stretching installation for short.

In particular, in the case of a simultaneous stretching installation, a plastics film F to be stretched (or another material web) can be gripped in the entry region E by grippers (discussed further in the following) which seize and damp the material web at both edges 8, specifically on the operator side (OS) and on the drive side (DS). The film F is subsequently heated in a downstream preheating zone PH and subsequently supplied to the aforementioned stretching zone R. After stretching, the stretched film F passes through various heat treatment zones HT, in which the film may also be relaxed. At the end of the stretching installation, in the exit zone A, the film is unclipped by suitable means and subsequently leaves the stretching installation.

Along the aforementioned encircling path, a shared support structure for the rail system and thus for the transport system may be provided such that the transport system can be used both on the stretching or process side RS and on the return side RL.

Otherwise, a separate support structure may also be provided for the stretching side RS and the return side RL such that, in this case, only the stretching-side support structure along with the associated guide rail and/or a weight running rail extends through the furnace O and a correspondingly formed further support structure is provided on the return side RL outside the furnace O. A corresponding construction is shown in the schematic plan view in FIG. 1b.

Figure 2:
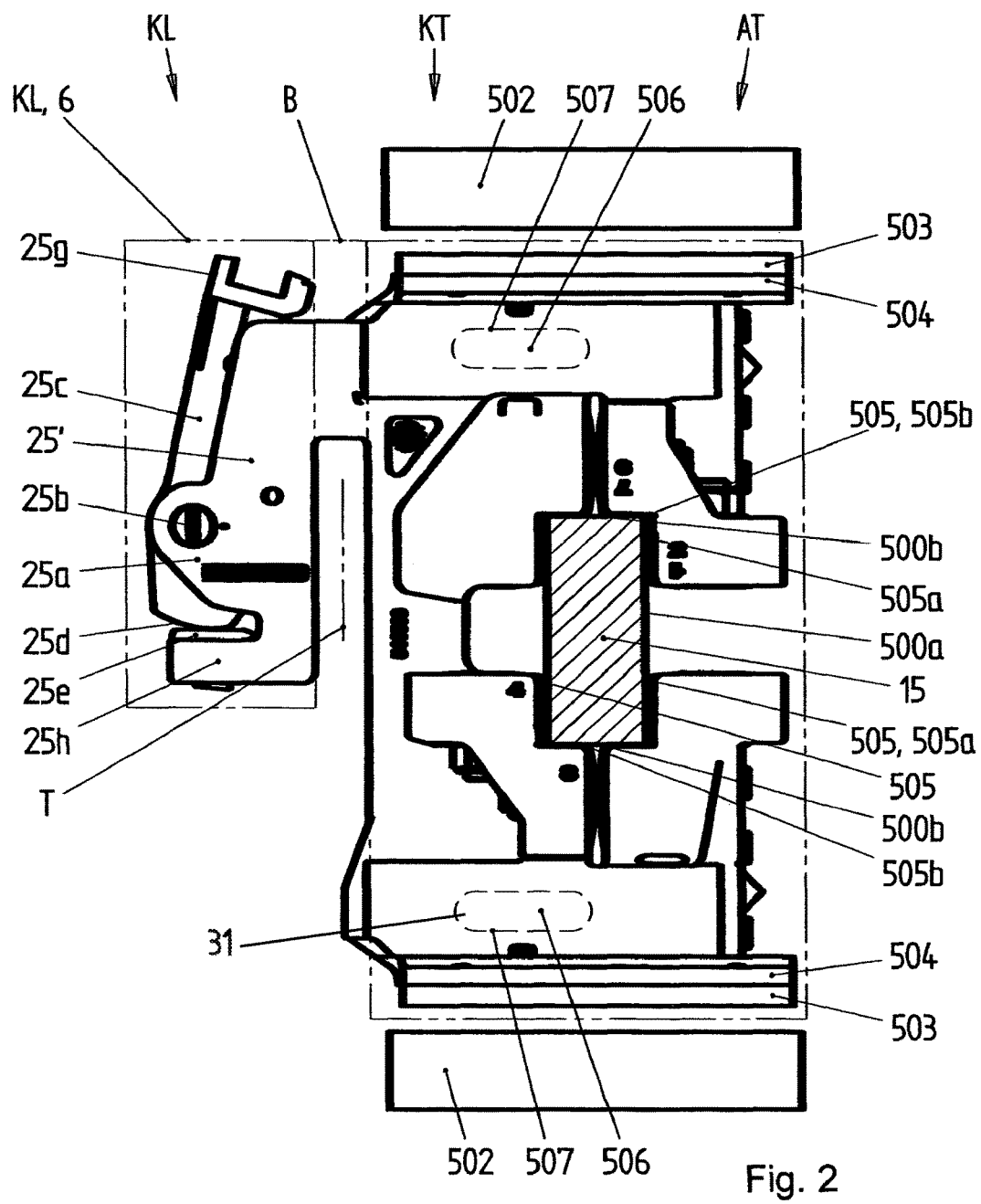
FIG. 2 is a detailed schematic cross section through a transport unit comprising a gripper unit and a drive unit which is displaceable along a guide rail by means of a roller bearing, specifically in accordance with the prior art.

FIG. 2 is a schematic side view or cross section (vertical cross section through a guide rail) of the construction of a transport unit KT driven by a linear motor, as can be used in particular for a simultaneous stretching installation.

The transport unit KT shown in cross section in FIG. 2 is subdivided into a gripper unit KL and a drive unit AT. The gripper unit KL is connected to the drive unit AT via an upper bridge B, it also being possible to interpret the bridge as being part of the gripper unit KL and/or the drive unit AT. The gripper unit KL, which ultimately consists of or comprises the gripper part 6, is comparable to conventional grippers in terms of its functional construction. The gripper units KL therefore basically comprise a gripper mounting 25a which serves to receive and fix a material web or film web between a gripper lever 25c (the blade flap) and a gripper table 26e. The edge 8 of the material web or in particular the plastics film F is thus clamped between the leading free end of the blade flap 25c and the gripper table 25e by a self-locking mechanism. The blade flap 25c in question is pivotally mounted on the gripper body 6 in this case, in other words on the gripper mounting 25a, by way of an axle 25b (which extends substantially in parallel with the guide rail), and can thus be held in the open position by way of a spring mechanism (not shown in greater detail). The blade flap itself consists of two functional sub-groups in this case, specifically the gripping face 25d (positioned adjacent to the gripper table 25e) and the opening part 25g (on the opposite side of the rotary axle 25b), which may be configured in various forms depending on the opener system (which may operate mechanically and/or magnetically). In the embodiment shown, the aforementioned gripper mounting 25a consists of two parallel holding members 25'a, which are spaced apart in the longitudinal direction of the rotary axle 25b and between which the axle body 25b of the pivot axle 25b thus formed is held for pivoting the blade flap 25c.

As stated, this gripper unit KL comprising the gripper part 6 is connected via the aforementioned bridge B to the drive unit AT, which in the case of the embodiment under discussion, in a system driven by a linear motor, comprises secondary parts KS, sometimes also referred to in the following as secondary parts 503. These secondary parts 503 are each held on the drive unit AT by retaining cages 504, in the embodiment shown an upper and a lower secondary part being fixed to the drive unit, in other words in a parallel position with respect to an upper or lower linear motor drive in each case which comprises primary parts 502. These primary parts 502 generally consist of coils by way of which electromagnetic fields can be generated for advancing the drive units AT. In this regard, reference is made to known drive installations driven by a linear motor in general and to stretching installations in particular. Simultaneous stretching installations of this type driven by a linear motor are known for example from EP 455 632 or DE 44 36 676, and reference is made to the entire disclosure thereof.

In these examples, the guide rail 15 shown in cross section in FIG. 2 additionally acts as a support rail (monorail) for the gripper transport units KT.

Both the aforementioned primary parts and the aforementioned secondary parts may be attached in one or more positions in relation to the guide rail 15 (above, below, to the side). The secondary parts 503 consist of permanent magnets which are held in the aforementioned retaining cage 504, which is in turn fixed to the drive unit AT. The gripper units KT are mounted by way of roller bearings 505.

FIG. 2 shows the guide and weight rail 500 (monorail) in cross section with respect to the longitudinal direction thereof. It has a rectangular cross section in the embodiment shown.

Two pairs of rollers or wheels 505a, arranged mutually offset in the horizontal direction, each run along on the two vertically orientated running faces 500a, which are offset in parallel with one another and face away from one another, in other words one pair of rollers on the gripper side or film side and the other pair of rollers on the side facing away therefrom. These rollers each rotate about vertical axes (not shown in greater detail). At least one further pair of rollers 505b, which rotate about horizontal axes, runs along on the upper horizontal running face 500b and the lower, parallel, in other words horizontal, running face 500b which is at a distance therefrom in each case, This rail 500 thus guides the entire advancing transport unit KT along with the gripper units KL and the drive units AT, and holds them so as to support their weight. The gripper transport unit KT is subdivided along a vertical, imaginary separating plane T shown in FIG. 2 into the gripper part 6 (comprising an upper bridge B) and the adjacent gripper part or transport part 7. This separating plane T extends in parallel with the vertical running faces 500a of the guide rail and support rail 500.

Further, in each case a damper device 506 is further shown positioned at the top and bottom on the transport part or drive part AT in the cross-sectional view of FIG. 2, and serves to absorb shocks if the corresponding drive or transport units comprising the associated grippers run into one another on the return side before reaching the entry zone.

The transport unit KT illustrated in FIG. 2 comprising the gripper part 6 and the drive part 7, consists, in terms of its basic construction, of a cast part which is subsequently processed accordingly and completed by inserting the aforementioned blade flap 25c and the associated rotary axle 25b together with the axle body 25'b. Also, in general holes 31 are also made in or subsequently machined in the cast body, so as for example to insert the aforementioned dampers 506 there. Likewise, all of the aforementioned running rollers along with the associated roller axles also have to be anchored to and mounted on the cast body. In general, the gripper table 25e is also processed or a gripper table plate 25'e is mounted and inserted on the corresponding table support 25h.

FIG. 3a is a schematic three-dimensional drawing of a corresponding conventional cast body SK, which comprises the drive unit AT and the gripper unit KL, specifically prior to being equipped with the aforementioned parts, such as the blade flap, running rollers, damper etc.

FIG. 3b is a corresponding drawing of the same transport unit KT, but now in completed form together with the blade flap 25c (gripper lever), which along with the associated axle body 25b is anchored to the two wall portions 25'b which extend mutually laterally spaced apart, The gripper lever, in other words the blade flap 25c, is then pivotally held between these two wall portions 25'a. In addition, the aforementioned gripper table plate 25'e is also inserted and is held so as to be supported on the gripper table holder 25h located therebelow. Primarily, all of the running rollers which rotate about horizontal and vertical axes are inserted into corresponding receiving spaces 603. Likewise, corresponding holes for anchoring the rotary axles of the running rollers are also provided, into which the corresponding rotary axles of the running rollers are inserted, the rotatable running rollers thus being held. Likewise, recesses 507 are also provided in the cast bodies, into which recesses the aforementioned damper elements 506 are inserted.

The relevant secondary part 503 (generally in the form of permanent magnets) is then also mounted at the top and bottom in each case, and these are fixed to the relevant gripper body via retaining cages 604.

In the context of the invention, however, a cast body in accordance with the aforementioned embodiments of FIGS. 3a and 3b is no longer used as a base structure; instead a forged body is used.

In the following, reference is made to FIG. 4a to 4c which show a first embodiment according to the invention.

Unlike in the prior art, the transport unit KT, in other words both the gripper unit KL belonging to the transport unit KT and the associated drive unit AT, are now formed, in terms of the essential component thereof, in other words in terms of the basic configuration thereof, from a forged part ST. The forged part ST used for this purpose, shown in its initial thereof in FIG. 3a, may also be referred to as a forging blank SR.

The embodiment of FIG. 3a shows a forged part of this type as a base structure, in other words the forging blank SR for a transport unit KT, such as may be used, by way of the above embodiment known in the art, for a transport system driven by a linear motor, in particular a stretching installation driven by a linear motor.

When producing a forged part ST of this type, in other words when producing a forging blank SR of this type, the generally applicable rules for a formation that is appropriate for forging should be observed. These rules only differ to a limited extent from the rules for producing a corresponding cast part.

When producing a forged part ST (forging blank SR) of this type, it should be ensured for example
that the wall thicknesses are appropriate for forging,
that no material accumulations occur,
that changes in thickness are kept to a minimum, and
that thickness transitions take lace as uniformly as possible, etc.

It has thus been found in the context of the invention that, when the forging blank SR is forged, wall thicknesses not less than a minimum of 4 mm should be produced. Although a basic minimum thickness of 2 mm and above, in particular 3 mm and above, is also sufficient in some individual cases, wall thicknesses of ≥3.5 mm, 4 mm, 4.5 mm, 5 mm, 5.5 mm or 6 mm are preferred.

All known methods are conceivable for the forging method itself.

In this connection, according to Wikipedia, forging may be characterised as pressure forming metals between two tools without cutting by way of changes in cross section. The forming itself generally takes place at a very high pressure at normal temperature, or at a processing temperature higher than normal temperature (hot forming). Cold forming is also known, which takes place below normal temperature at a recrystallisation temperature.

In general,
hot forming,
cold forming or
thixoforging
are known,

Since there are no limitations in this regard, reference is hereby made to all previously known forging methods which may be used in the context of the invention.

From the drawing of the forging blank according to FIG. 3a, it can also be seen that this forging blank is formed without undercuts.

Subsequently, the basic construction of each transport unit, as shown in a simplified schematic drawing in FIG. 3b, can be created from this forging blank by post-processing, This forging blank processed according to FIG. 3b is distinguished in that, starting from the forging blank shown in FIG. 3a, all functional structures are processed in a corresponding manner, for example
screw connection faces 715 and holes 716 for the roller bearings 505 including a roller bearing protective housing 717, known as the retaining cage (which thus encloses the rollers in part at the peripheral faces remote from the running faces),
the guide slots 507 for the aforementioned dampers 506,
the corresponding holes 717 for receiving the rotary axle body 25'b for the blade flaps 25c, and
the corresponding anchoring apparatuses 723 for anchoring the gripper table plate 25'e.

Figure 4B:
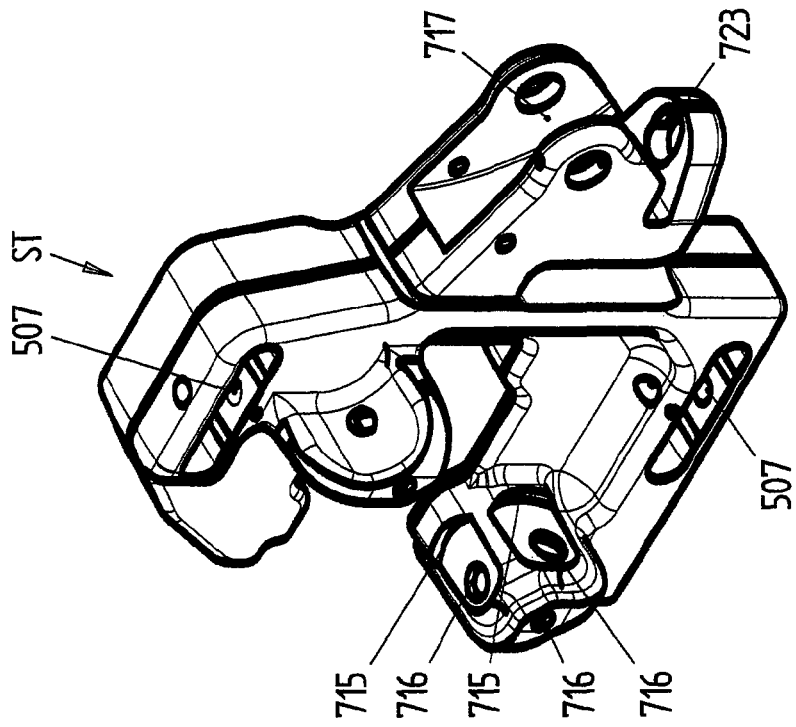
FIG. 4b is a detailed three-dimensional view corresponding to FIG. 4a after the forging blank has been processed.
Figure 4A:
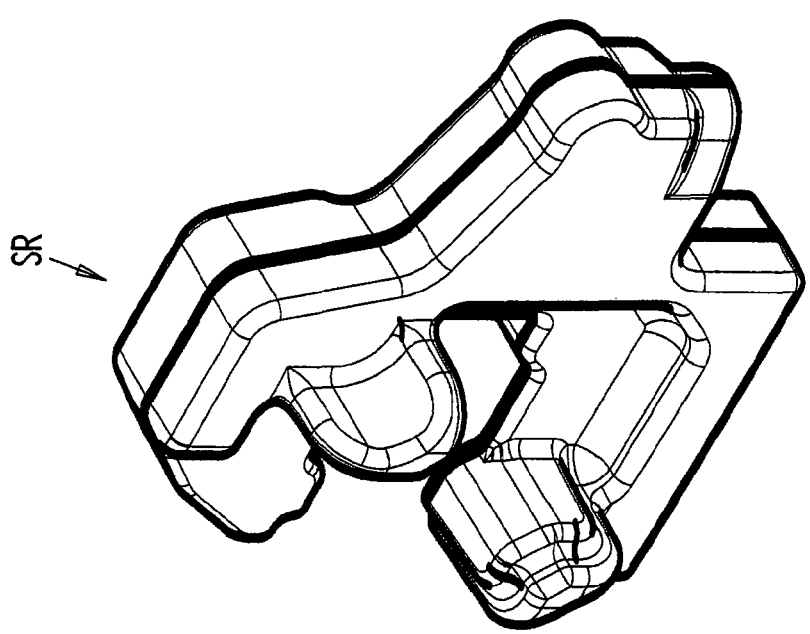
FIG. 4a is a detailed view comparable to FIG. 3b of a transport unit according to the invention in the form of a forging blank which is yet to be processed.

From a direct comparison between FIGS. 4a and 4b, it can thus be seen that the corresponding holes or the corresponding blade flap recesses 125 have been produced by post-processing the forged body, or can be produced thereby if post-processing is required.

Figure 4C:
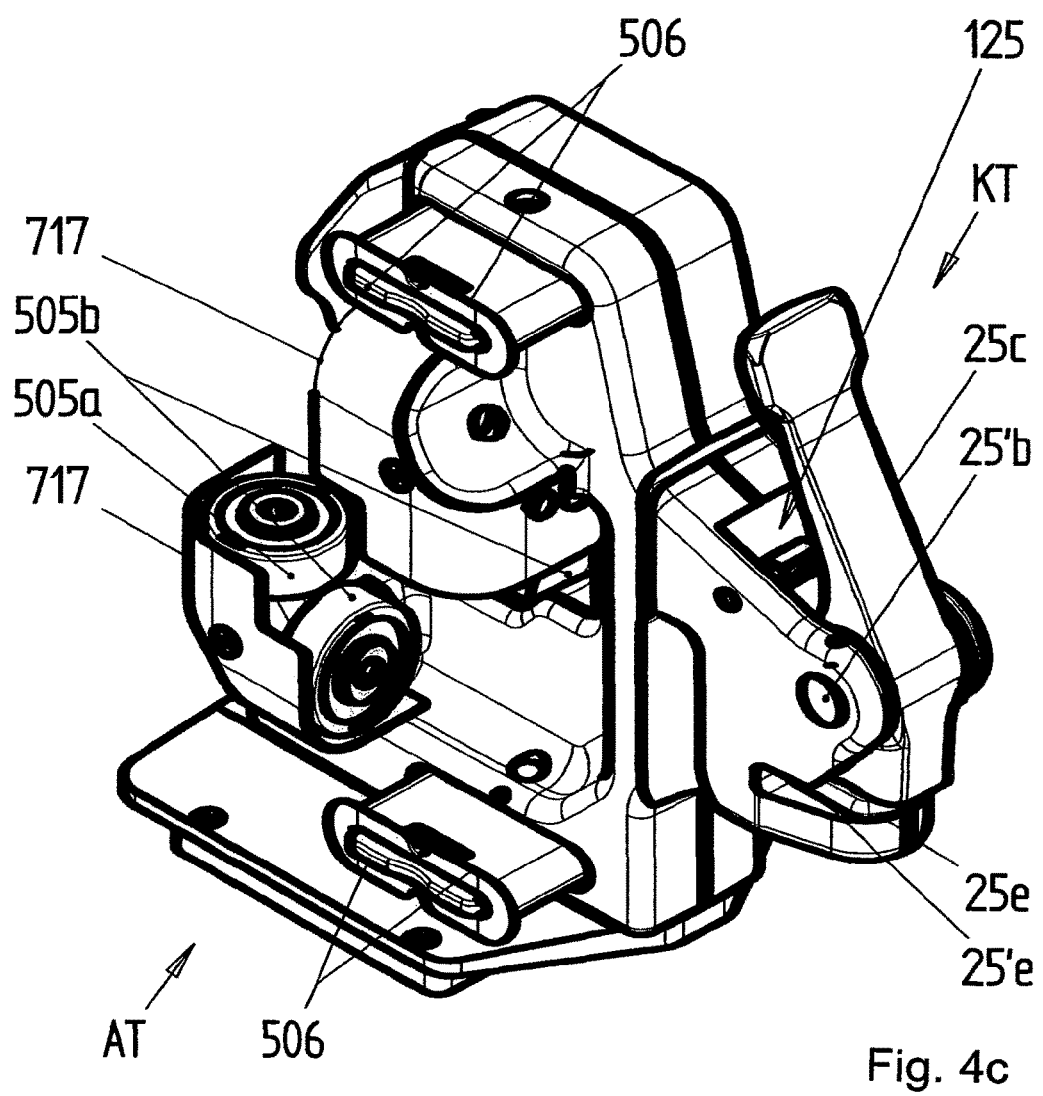
FIG. 4c is a detailed view corresponding to FIG. 4b of a fully equipped transport unit.

FIG. 4c shows the gripper part KT formed on the basis of a forged part ST, into which the aforementioned installation parts such as the blade flap, damper, running rollers and running roller mounting or running roller housing are inserted.

In the embodiment shown, the gripper unit KT as a whole thus consists of a forged part or forged body ST, with the exception of the processing measures carried out thereon and above all the additional parts and installation parts used in the context of the processing measures, as set out above.

A corresponding gripper unit KT in the finished state as shown in FIG. 4c can therefore also be described within the context of the invention to the effect that a complete gripper transport unit KT of this type has a proportion by volume or weight of at least 60%, in particular at least 65%, 70%, 75%, 80%, 85%, 90%, or of at least 95%, which is formed by a forged part. In particular, the installation parts may consist of steel, cast iron or other materials.

Figure 5A:
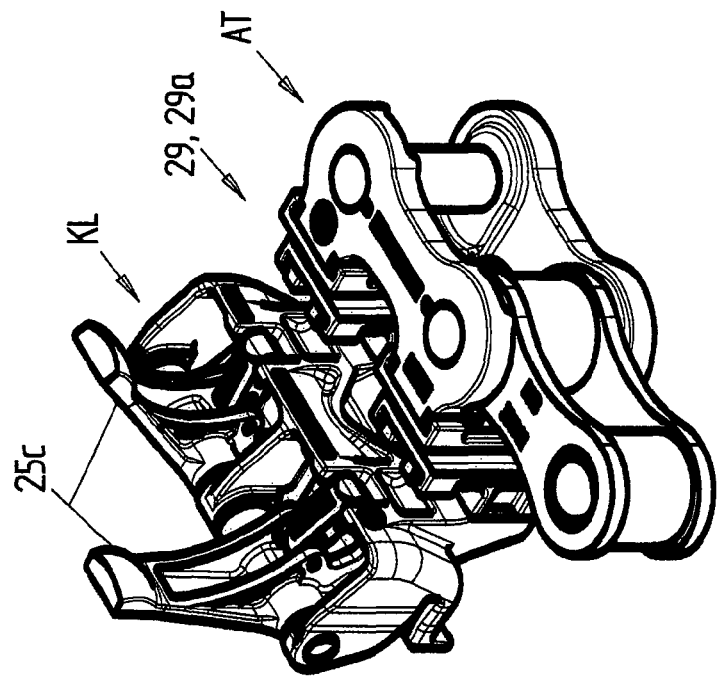
FIG. 5a and FIG. 5b are detailed three-dimensional views, from different viewing angles, of a modified embodiment in accordance with the prior art of a transport unit, the drive unit of which consists of chain members and is equipped by means of a slide bearing.
Figure 5B:
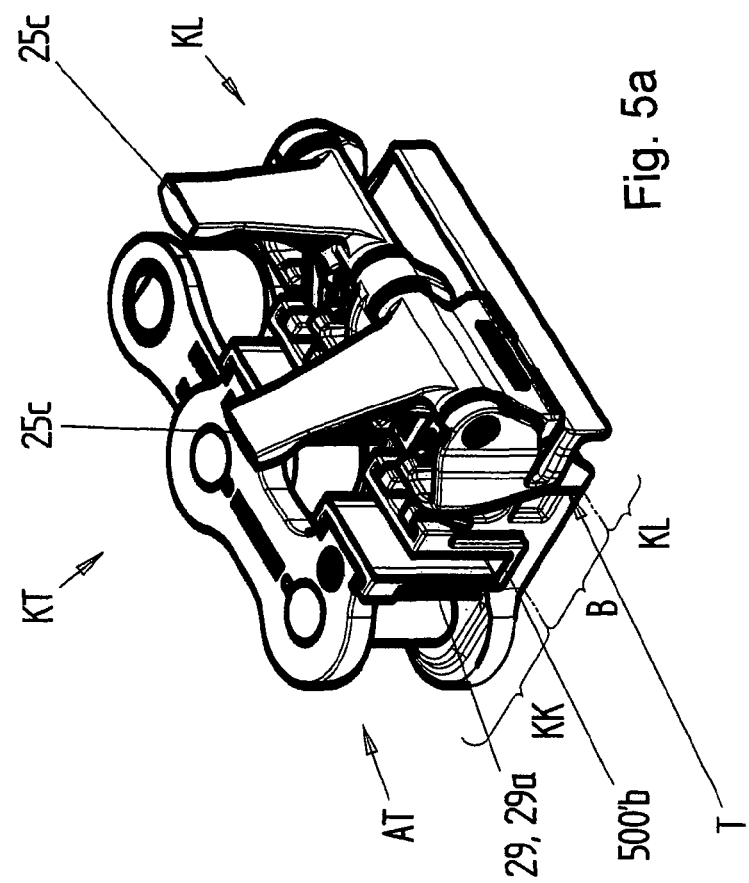

FIGS. 5a and 5b show a modified embodiment according to the prior art in a view from above and in a view from below, in particular from the gripper part.

FIGS. 5a and 5b show a transport unit KT such as may be used for example for a transverse stretching installation. Therefore, as in the previous embodiment, the transport unit KT likewise comprises a gripper unit KL which is connected to the drive unit AT via a bridge B. However, in this embodiment the drive unit AT does not consist of a unit driven by a linear motor, but instead of chain units KK, which are articulated to one another by chain pins as has long been known.

This embodiment also differs in that a slide bearing 29 is provided instead of a roller bearing. In other words, the transport unit KT configured in this manner is moved along a guide rail 500 by way of a sliding block 29a of a U-shaped cross section, the opposite sliding faces of the sliding block 29a lying against the vertical running or sliding faces 500a of the guide rail 500 and the upper horizontal sliding face 500b lying on the upper face 500b, extending horizontally in the embodiment shown, of the guide rail 500 and bearing the weight of the transport unit. In this embodiment too, corresponding gripper levers 25c are provided which are pivotable about a vertical axis 25b so as to form an axle body 25'b. The gripper lever or the gripper blade 25c again comprises a lower clamping portion 25d, by way of which the edge of a material web or plastics film web F can be held with respect to a gripper table 25e. To avoid repetition, reference is therefore made to the previous embodiment for the case of a linear motor drive or for other previously known comparable embodiments.

In this embodiment too, the body of the transport unit KT or at least of the drive unit AT, in this embodiment in the form of a chain unit KK, can now be formed from a forging blank SR such that, in this embodiment too, the basic structure of at least part of the transport unit KT is again formed from a forged part ST.

In this regard, reference is made to the following embodiment.

Figure 6B:
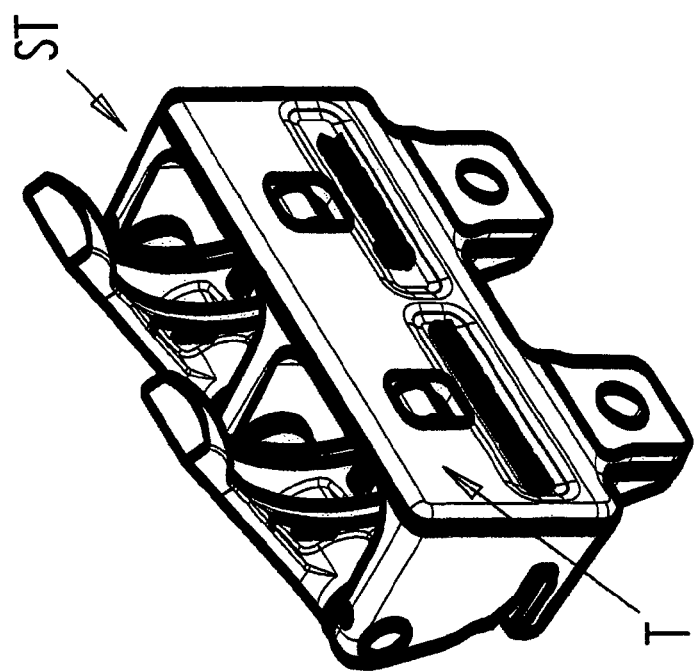
FIG. 6a and FIG. 6b are two detailed views according to the invention, from different viewing angles, of a gripper unit in each case which can be mechanically connected to a drive unit, the gripper unit being produced on the basis of a processed and fitted forging blank.
Figure 6A:
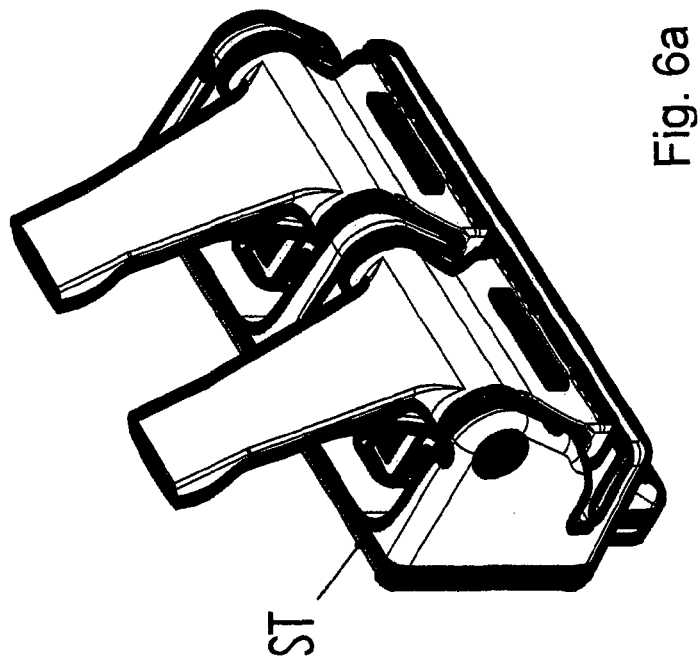

FIGS. 6a and 6b show an embodiment according to the invention of a fully equipped gripper unit KL, which is produced by forging or substantially by forging and which is subsequently connected to a corresponding drive unit AT, in this case in the form of a chain unit KK, which for example is also produced from or comprises conventional chain units as in the prior art.

So as now to be able to produce one or more units of the transport part without undercuts by forging, a separating line T is provided.

The transport units can then be divided along this separating line T into a chain unit KK produced in a conventional or relatively conventional manner and a chain unit KK produced predominantly by forging, which is produced without undercuts.

The gripper unit KL based on a forging blank is shown in FIG. 6a from the upper face of the blade flaps and in FIG. 6b from the rear face, in each case in a perspective drawing and in the equipped final version.

Figure 7B:
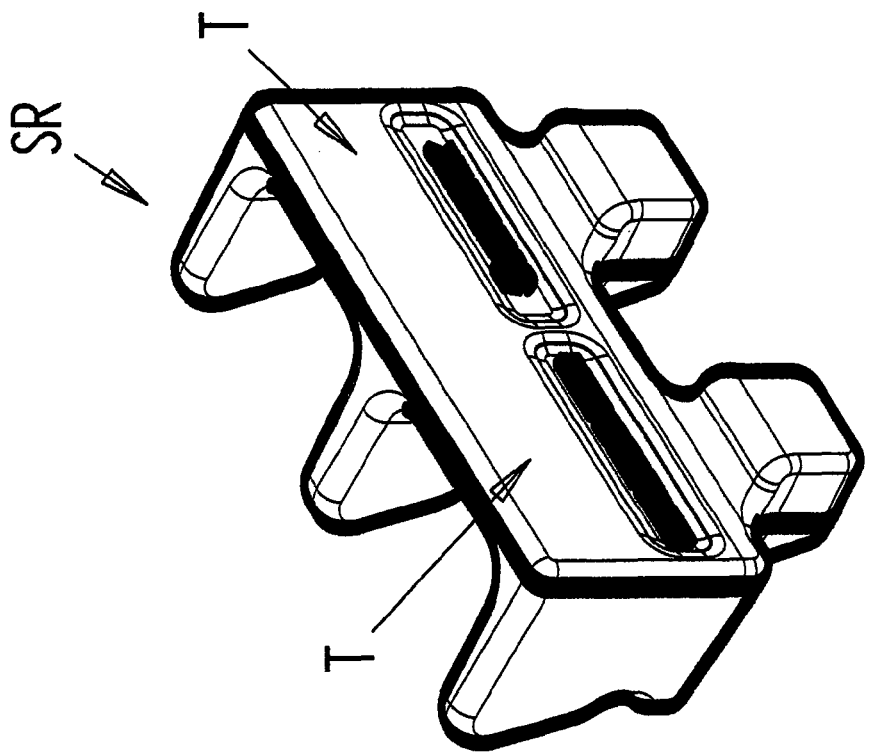
FIG. 7a and FIG. 7b are two detailed views corresponding to FIG. 6a and FIG. 6b of a forging blank as a starting point for the chain units according to the invention.
Figure 7A:
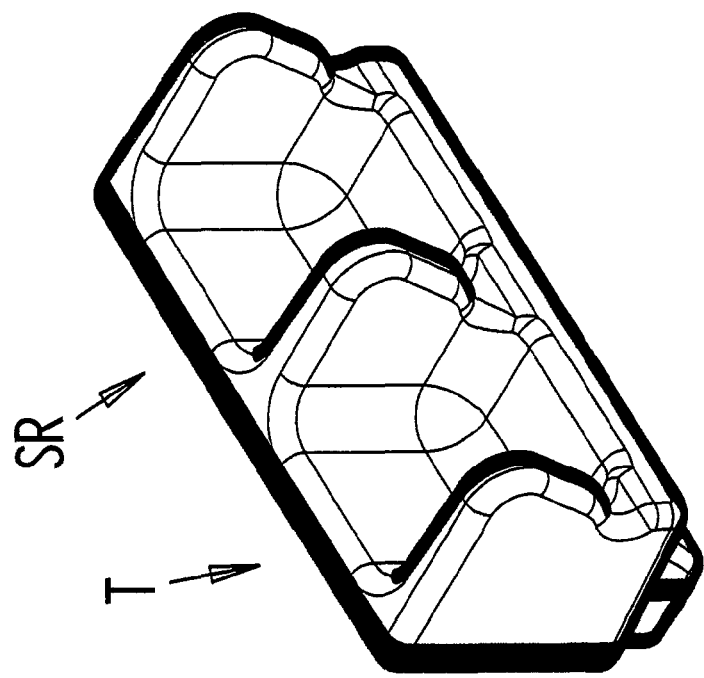

In FIGS. 7a and 7b, the forging blank SR is shown from the blade flap side thereof, in a view comparable to FIG. 6a, and is shown in FIG. 7b from the corresponding rear face. As regards the production of this forged part ST in the form of a forging blank SR, the above statements regarding wall thickness, production of the parts without undercuts, etc. still apply.

This forging blank SR is subsequently again processed accordingly, in other words corresponding holes 801 or recesses 803 in general are formed in the forged material. Likewise, regions 805 of the forged material are removed, in particular planed, for example by milling, etc.

In FIGS. 8a and 8b, it can be seen that the entire receiving space for receiving the blade flaps including the gripper table 25e, the rear face and the inward-facing faces of the lateral or holding cheeks 25' of the holding apparatus for the blade flaps 25c is worked at the surface, in other words processed. In this case, material is removed from the forging black SR everywhere so as to taper the material thickness, in order to have smooth faces or suitable faces, including installation faces for the further parts and components to be installed here, prepared. The same applies to the installation faces 806 visible on the rear face in FIG. 8b, on which the drive unit AT can then be installed so as to rest thereon in a plane parallel manner, so as to form the separating line T.

As a result, starting from the forging blank SR according to FIGS. 7a and 7b, a processed forged part ST is obtained, such as is shown at a corresponding viewing angle in FIG. 8a and 8b.

This processed forged part ST is subsequently in turn equipped, specifically with the blade flaps 35e and the blade flap axles 25'e which hold the blade flaps 25e.

By way of screw connections which can be introduced into the lower holes 801a, the gripper units KL which has thus been produced on the basis of a forged part ST can subsequently be rigidly connected to the associated drive unit AT, in this case in the form of a chain unit KK.

FIGS. 9a and 9b in turn show an embodiment in accordance with the prior art for a transport unit KT similar to the previous embodiment. The embodiment according to FIGS. 9a and 9b differs from the embodiment known in the art according to FIGS. 5a and 5b in that the transport unit KT is not held on the guide rail 500 by a slide bearing but instead by a roller bearing, comparable to the roller bearing described previously by way of the initially mentioned embodiment according to FIGS. 4a to 4c.

FIGS. 9a and 9b each show a fully constructed and processed gripper unit KL according to the invention, which is again formed on the basis of a forged part ST, specifically by correspondingly processing a forging blank SR. Since in this case too, similarly to in the previous embodiments, merely the gripper unit KL connected to the drive unit AT, rather than the drive unit AT itself, is produced on the basis of a forging blank or forged part (forged body), the drive unit AT known in the art is not shown in greater detail in FIGS. 9a and 9b either for the purpose of improved clarity.

The processed and fully constructed gripper units KL shown in FIGS. 9a and 9b are shown from the roller guide side thereof and from the rear side, in other words the blade flap side. For completion, these parts are subsequently for example rigidly interconnected using corresponding drive units AT, for example by screwing, the drive units in this case for example consisting of or comprising chain parts similar to in the previous embodiments, or lever parts if it is a pentagraph system such as is found in a simultaneous stretching installation rather than in a transverse stretching installation. in this regard, the guide rail (or the control rail additionally provided in the case of a pentagraph system) is not shown in FIGS. 9a and 9b either for the purpose of improved clarity.

Figure 10B:
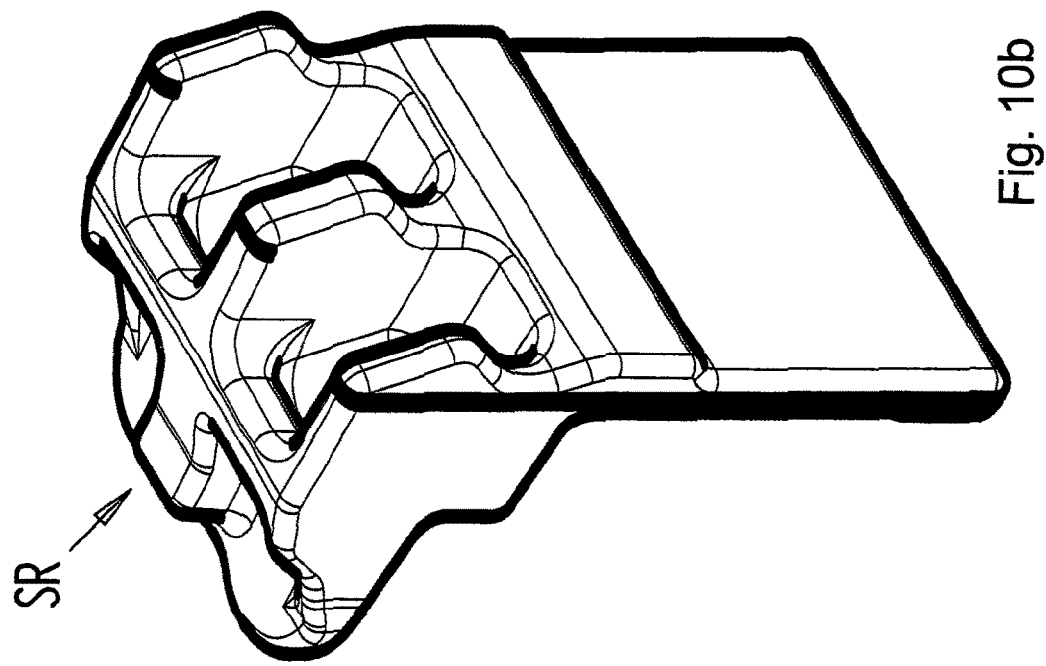
FIG. 10a, FIG. 10b are each a detailed view of a forging blank according to the invention as a starting point for a gripper unit when unprocessed.
Figure 10A:
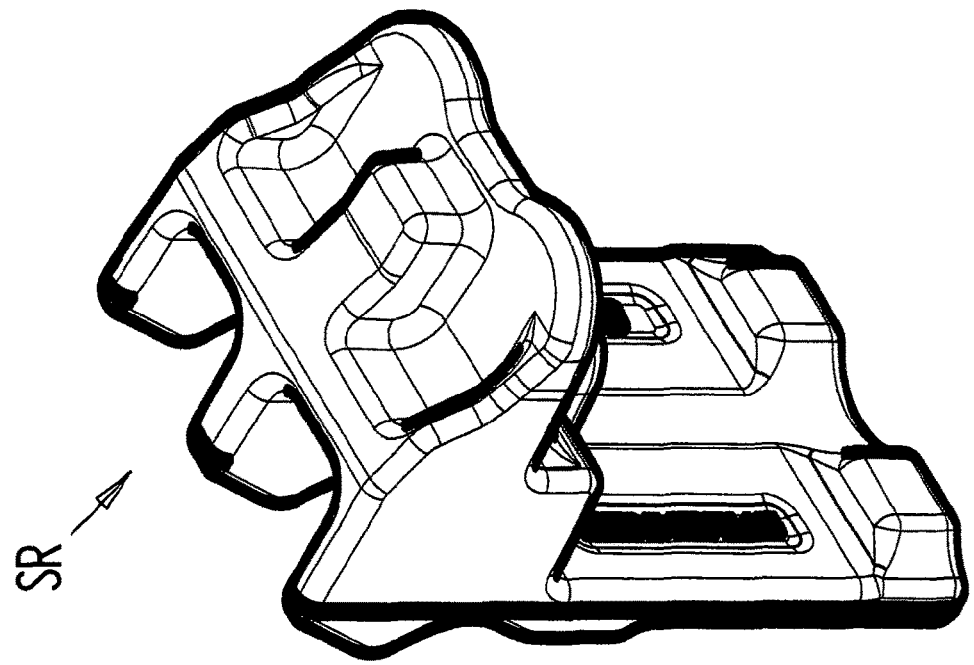
Figure 11B:
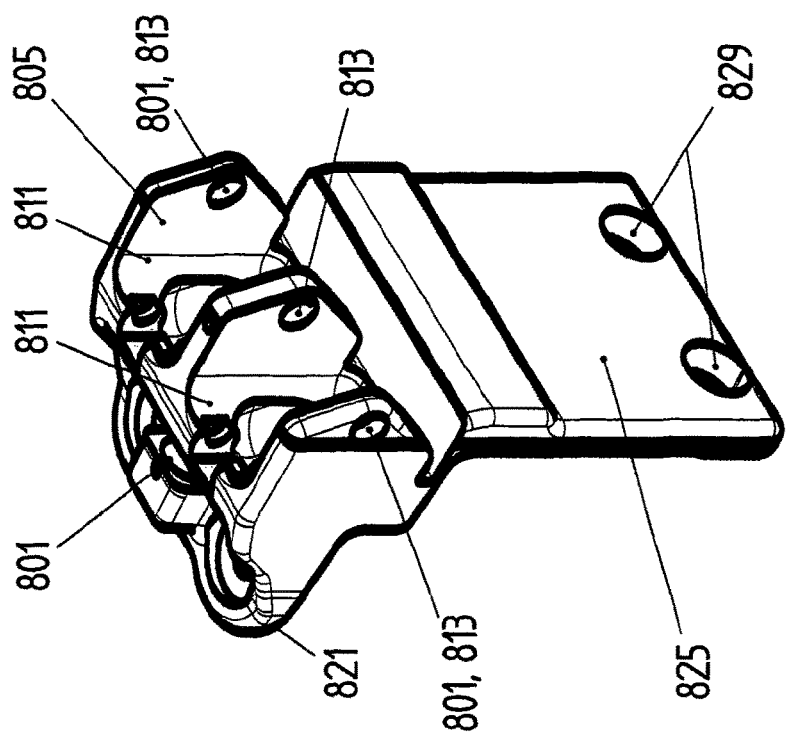
FIG. 11a, FIG. 11b are detailed views corresponding to FIG. 10a and FIG. 10b, in which the forging blank is shown in the form of a processed forged part prior to being equipped with installation parts.
Figure 11A:
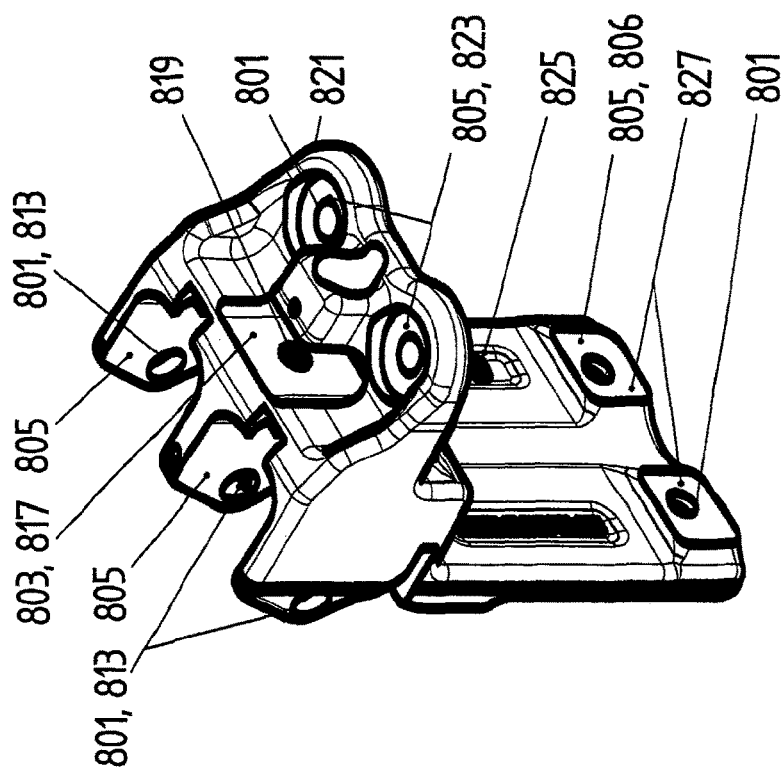

FIGS. 10a and 10b in turn show corresponding drawings of the forging blank SR for the disclosed embodiment. The forging blank encloses the complete structure of the body including elevations, various wall elements, members, recesses, etc., which are produced to an appropriate, preferred wall thickness as stated above, so as to form various depressions or slots, etc. Ultimately, however, this is again a configuration of the forging blank SR without undercuts.

Subsequently, this forging blank SR is processed again as described, by making a series of holes 801, recesses 803 and material-removing surface machinings 805, etc.

Thus for example in the embodiment of FIGS. 10a and 10b, the vertical holding members 25'a are correspondingly machined off in a plane-parallel manner in such a way that in each case the aforementioned blade flaps 25c along with the associated pivot axle bodies 25'b thereof can be installed there in the recesses 811, positioned side by side, for which purpose the blade flap axle holes 813 are made in the holding members or holding member walls 25'a.

On the opposite side of the central longitudinal member 805, a running roller slot 817 is likewise again machined out of the material, and in addition a running roller axle hole 819 is made which extends transversely thereto such that an aforementioned running roller rotating about a horizontal axis can be installed here, which rolls along on the upper horizontal running face 500b of the guide rail 500 when in the installed state.

Accordingly, corresponding running roller anchoring portions in the form of a depression 823 are machined out on horizontal wall portions 821 such that the running rollers which rotate about vertical axes can subsequently be installed and anchored on the lower face of this horizontal wall portion 821 (FIGS. 9a and 9b).

At the bottom of the vertical central wall 825, a lower roller bearing mounting 827 can subsequently be fixed by screwing in holes 829 correspondingly previously made in the central wall portion 825. This mounting itself need not be formed as a forged part like other installation parts.

In conclusion, it can thus be established that on the one hand a transport unit KT along with the gripper unit KL thereof and the associated drive unit AT (and an optionally present bridge part B) may be produced on the basis of a forging blank SR. However, it is equally possible for a transport unit KT of this type to be divided at least along a separating line in such a way that only part of this transport unit KT, in particular the gripper unit KL, is produced on the basis of a forging blank SR.

This forging blank SR is subsequently post-processed in a suitable manner so as to machine corresponding recesses, depressions, slots and holes or to produce, by machining off material, plane-parallel faces at which particular installation parts can subsequently also be installed or accommodated in corresponding recesses such as are required for a conventional gripper unit KL. The corresponding moving parts, such as blade levers or rollers, etc., may likewise be accommodated and mounted here.

Further parts providing the rolling and/or slide bearing may also be installed and mounted as installation parts on a forging blank of this type at a separating line (interface).

The drive part itself may have a wide variety of designs. It may be provided for a linear motor drive or for a chain drive comprising lever parts for a control rail in the case of a pentagraph system. Mixed systems are also possible, which partly comprise a roller bearing and partly comprise a slide bearing.

In this context, the finished transport unit KT or at least the gripper unit KL provided in the context of the finished transport unit KT may, in terms of the basic or predominant structure thereof, be formed from the aforementioned forged part or forging blank.

Generally speaking, the entire transport unit KT or at least the gripper unit KL or at least the drive unit AT may be formed from a forging blank such that the transport unit KT as a whole or at least the gripper unit KL and/or at least the drive unit AT has a proportion by volume and/or weight of at least 60%, in particular at least 65%, 70%, 75%, 80%, 85% or at least 90%, or in particular of at least 95% of the volume and/or weight of the overall finished transport unit KT or at least of the associated finished gripper unit KL or at least of the associated drive unit AT.

The invention claimed is:

1. Transport unit for a transport device, in a transverse, longitudinal and/or simultaneous stretching installation, the transport unit comprising a gripper unit integral with a drive unit wherein the transport unit is displaceable along a guide rail and/or support rail, and wherein:
    the transport unit comprising the gripper unit and the drive unit has a proportion by weight or by volume of at least 60% which consists of a forged part and/or is formed from a forging blank.

2. Transport unit according to claim 1, wherein more than 65% of the volume or weight of the transport unit or the gripper unit and/or the drive unit consists of a forged part and/or is formed from a forging blank.

3. Transport unit according to claim 1, wherein the forged part consists of a processed forging blank in which holes, recesses or material-removing surface machinings are formed or made.

4. Transport unit according to claim 3, wherein installation parts comprising at least one pivotable blade flap having an associated axle body and a slide bearing and/or roller bearing including associated running rollers, are mounted in the holes, the recesses and the material-removing surface machinings in the forged part.

5. Transport unit according to claim 3, wherein a slide or roller bearing mounting is screwed onto the forged part at an interface.

6. Transport unit according to claim 1, wherein more than 70% of the volume or weight of the transport unit or the gripper unit and/or the drive unit consists of a forged part and/or is formed from a forging blank.

7. Transport unit according to claim 1, wherein more than 75% of the volume or weight of the transport unit or the gripper unit and/or the drive unit consists of a forged part and/or is formed from a forging blank.

8. Transport unit according to claim 1, wherein more than 80% of the volume or weight of the transport unit or the gripper unit and/or the drive unit consists of a forged part and/or is formed from a forging blank.

9. Transport unit according to claim 1, wherein more than 85% of the volume or weight of the transport unit or the gripper unit and/or the drive unit consists of a forged part and/or is formed from a forging blank.

10. Transport unit according to claim 1, wherein more than 90% of the volume or weight of the transport unit or the gripper unit and/or the drive unit consists of a forged part and/or is formed from a forging blank.

11. Transport unit according to claim 1, wherein more than 95% of the volume or weight of the transport unit or the gripper unit and/or the drive unit consists of a forged part and/or is formed from a forging blank.

\* \* \* \* \*